No. 837,651. PATENTED DEC. 4, 1906.
F. W. WANDLESS.
SPEED CHANGING DEVICE.
APPLICATION FILED MAR. 14, 1905.
3 SHEETS—SHEET 2.
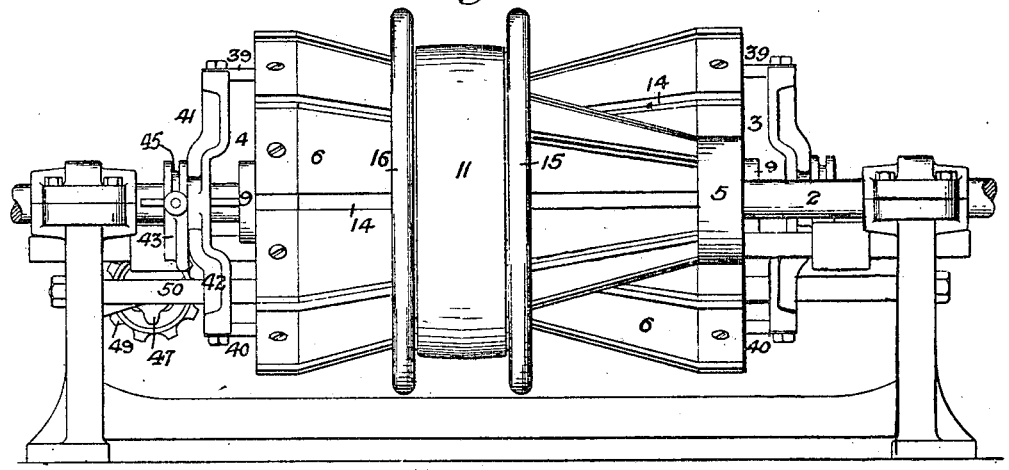
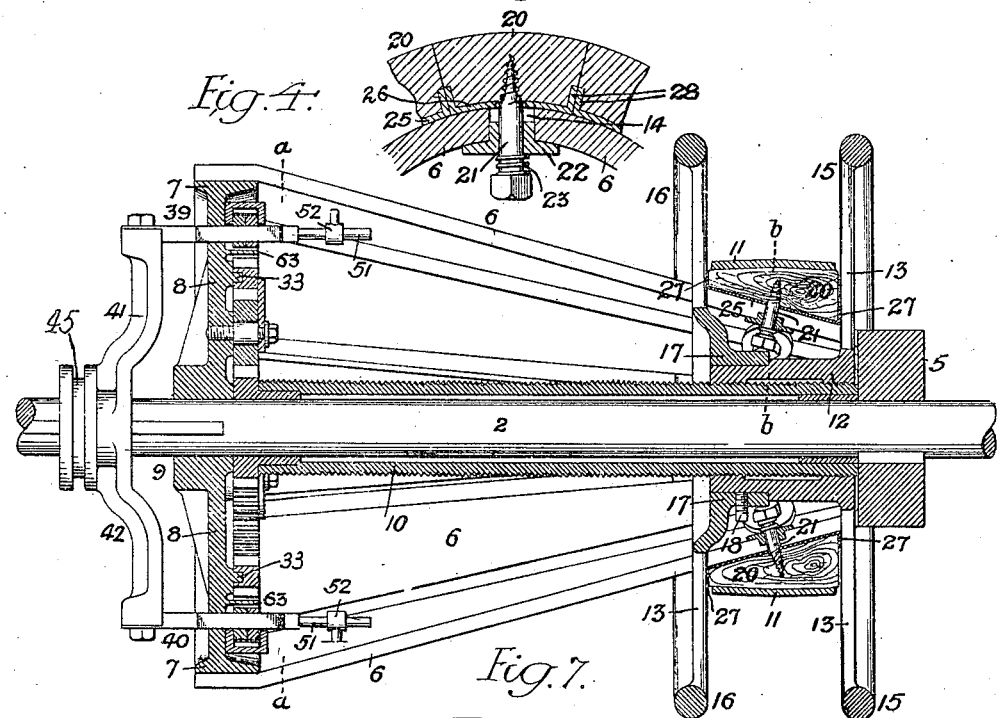
Witnesses:
Walter R. Pullinger
Augustus B. Coppes
Inventor:
Franklin W. Wandless
by his Attorneys,
Howson & Howson No. 837,651. PATENTED DEC. 4, 1906.
F. W. WANDLESS.
SPEED CHANGING DEVICE.
APPLICATION FILED MAR. 14, 1905.
3 SHEETS—SHEET 3.
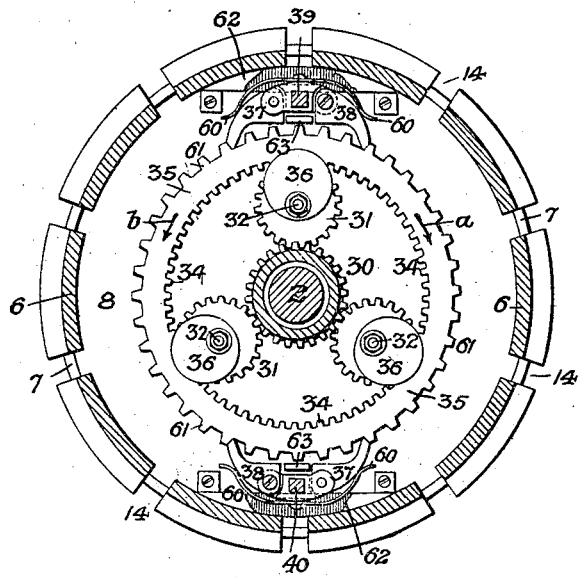
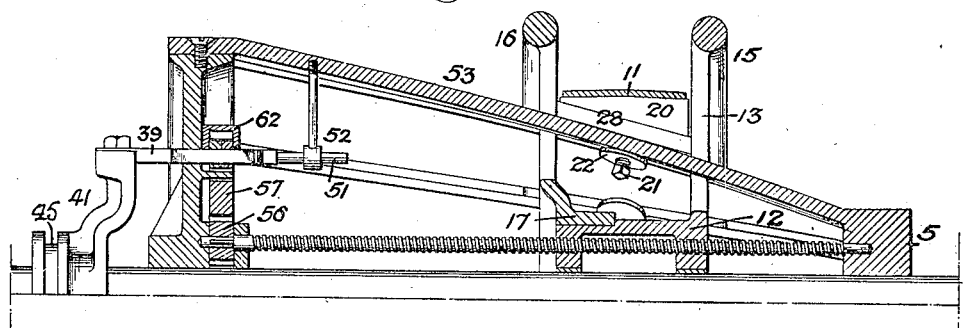
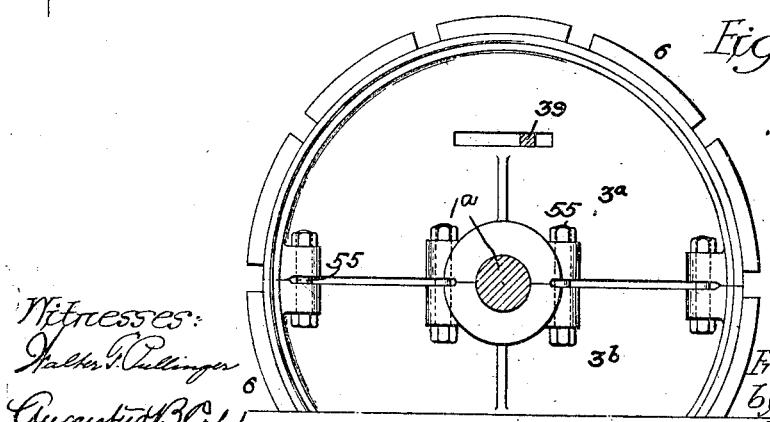
Witnesses:
Inventor
Franklin W. Wandless,
by his Attorneys,
Howson & Howson

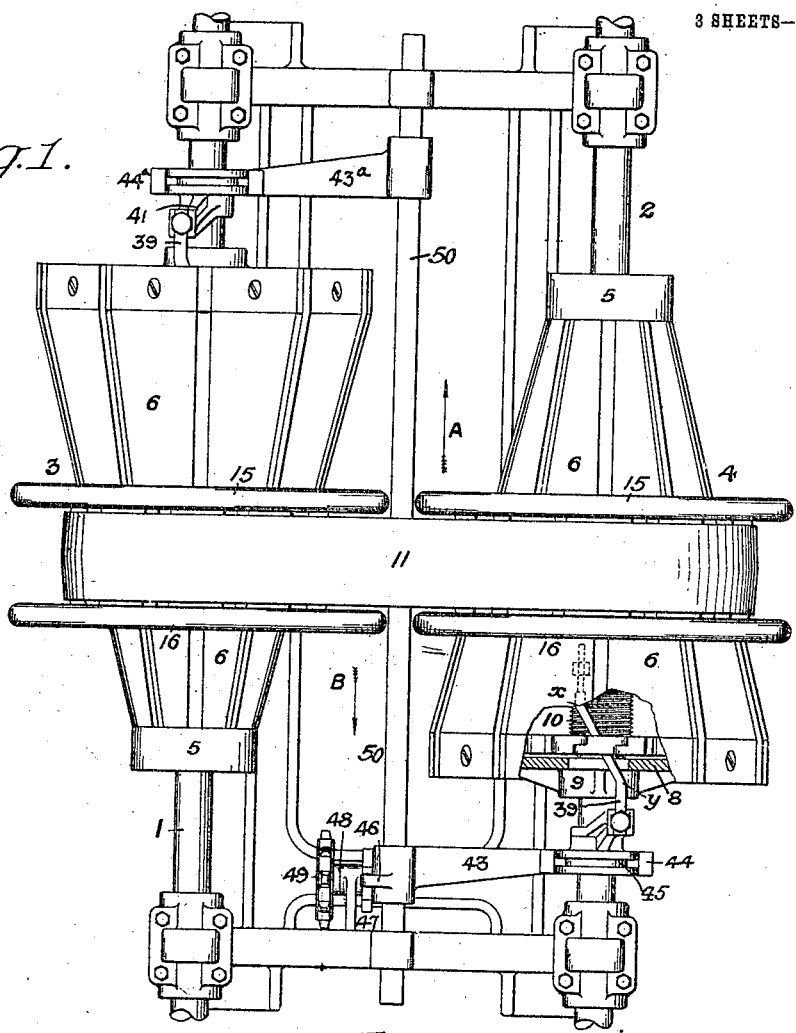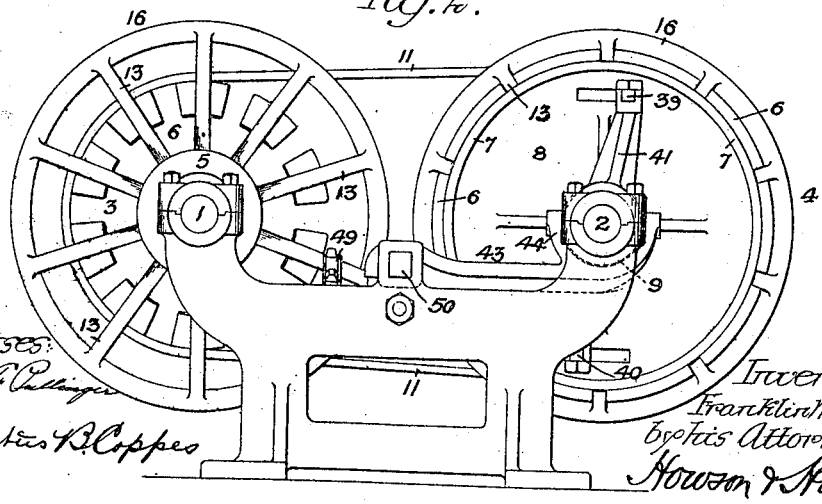

UNITED STATES PATENT OFFICE.

FRANKLIN W. WANDLESS, OF PHILADELPHIA, PENNSYLVANIA, ASSIGNOR OF ONE-HALF TO JOHN H. GAULT, OF PHILADELPHIA, PENNSYLVANIA.

SPEED-CHANGING DEVICE.

No. 837,651.     Specification of Letters Patent.     Patented Dec. 4, 1906.

Application filed March 14, 1905. Serial No. 250,050.

*To all whom it may concern:*

Be it known that I, FRANKLIN W. WANDLESS, a citizen of the United States, residing in Philadelphia, Pennsylvania, have invented certain Improvements in Speed-Changing Devices, of which the following is a specification.

My invention relates to certain improvements in cone-pulley speed-changing devices used in the transmission of power.

In practice heretofore to a very large extent the power which could be transmitted from a driving to a driven element through cone-pulleys was limited, owing to the fact that wide belts could not be used, the width of the belt being limited because of the taper or angle of the pulley or pulleys. This has been obviated to a great extent by the use of supplementary belts on each pulley, with or without an idler, to change the angle or taper of the same to a suitable crown to receive the power-transmitting belt.

The object of my invention is to provide a speed-changing gear of this type with means whereby the power-transmitting belt is supported and guided at all times, any desired width of belt used, and the power transmitted through the speed-changing gear materially increased without causing the belt to slip, to twist, or to travel laterally on the pulleys and without using a supplementary or auxiliary belt of any character.

While my invention relates particularly to a double cone-pulley change-gear, it will be understood that it may be used in connection with any power-transmitting mechanism in which the diameter of the driving or driven elements can be increased or diminished.

My invention is fully shown in the accompanying drawings, in which—

Figure 1 is a plan view of my improved speed-changing device. Fig. 2 is an end view of the same. Fig. 3 is a side elevation. Fig. 4 is a longitudinal sectional view of one of the cones on a slightly-enlarged scale. Fig. 5 is a sectional view on the line *a a*, Fig. 4. Fig. 6 is an enlarged sectional view on the line *b b*, Fig. 4. Fig. 7 is a sectional view illustrating the parts shown in Fig. 6 on the high end of the cone. Fig. 8 is a sectional view of a cone having an arched surface, showing my improvements combined therewith; and Fig. 9 is a view illustrating a further modification of my invention.

In the drawings herewith 1 and 2 represent the driving and driven shafts, upon which are mounted, respectively, the cones 3 and 4. These cones comprise hubs 5 at the smaller end, from which extend a series of arms or plates 6, suitably arched to form the rounded surface of the cone and secured at their opposite ends to the flange 7 of a disk 8, carried by a hub 9. As the cone-pulleys are alike and their belt-guiding mechanisms the same in each instance, being operated in the same manner, the description herein will be limited to one of said cone-pulleys and its belt-guiding mechanism, it being understood that the device in question when in use may be employed with a single cone or with a pair of cones coupled together in the usual manner common to cone-pulley speed-changing devices.

Surrounding the shaft to which the cone-pulley is keyed and suitably journaled thereon is a threaded sleeve 10, forming a screw-feed, upon which is mounted a shifter structure for the transmitting-belt 11, comprising a hub 12, having arms 13 extending through the slots 14 between the arms or plates 6 of the cone and connected at their outer ends by a suitable rim 15, and a section 16 for the opposite side, having a sleeve portion 17, which may be adjustably mounted on the hub 12 of the other section and secured thereto by any suitable means, in the present instance a set-screw 18 being employed. Disposed between the rims or arms of these sections are the segmental blocks 20, of wood or other suitable material, which sections are crowned for the reception of the power-transmitting belt 11 and are provided with means to secure them in position with respect to the cones. In the present instance a screw 21 is fastened to said blocks and passes through a guiding-washer 22, having a portion extending into the slot between the plates 6 of the cone. Other fastening means may be employed without departing from my invention. A spring 23, coiled around the shank of the screw and bearing against its head, is employed to keep said blocks in contact with the surface of the cone. I also mount between said blocks and the face of the cone a wear-plate 25, having portions 26 extending on both sides of the arms or spokes of the shifter members, so that said blocks will be properly guided and the strain incident to the movement of the transmitting-belt relieved. In addition, these wear-plates have portions 27 engaging the inner face of the arms and portions 28 which are bent into contact with the sides of the blocks.

The shifter mechanism controlling the power-transmitting belt is moved back and forth by the turning of the threaded sleeve, and the movement of this sleeve is accomplished in the following manner: This sleeve is mounted in such a way that while it turns with the shaft during the operation of the latter it may also be turned upon said shaft. Mounted on the threaded sleeve at the large end of the cone is a pinion 30, with which mesh other pinions 31, carried by suitable studs 32, secured to the disk 8, and these pinions in turn mesh with the internal rack 34 of a loosely-mounted annular racked member 35, supported in place by plates 36, eccentrically mounted on the studs or pins 32 and guided by an annular rib 33 on the disk 8. By moving this racked member 35 movement is imparted to the gears 31 and from them to the gear 30, carried by the sleeve, and the latter is turned. To effect the movement of the racked member, I provide pawls 37 and 38, mounted at the top and bottom of said racked member, and in engagement with these pawls and serving to move the same are the cam-rods 39 and 40, carried by the arms 41 and 42, connected to a collar 45, splined to the shaft and which is slidable upon said shaft when actuated by the yoke 44 of an arm 43. The said arm has a projection or tooth 46, so placed as to engage or mesh with the teeth of a wheel 47 on the end of a stud 48, such stud carrying on its opposite end a sprocket-wheel 49, which may be turned by a suitable chain to operate said arm and through the connections just noted move the cam-bars to operate the pawls. When this cam bar or rod is moved through the pawl structure from its central position so that its end $x$ approaches or engages the same, the racked member will be turned in the direction of the arrow $a$ and the shifting device will be moved in the direction indicated by the arrow A; but when the movement of the cam bar or rod is such as to cause its end $y$ to approach or engage the pawl structure the racked member will be turned in the direction of the arrow $b$ and the belt-shifting mechanism will be moved in the direction of the arrow B. The arm 43 is carried by a rod 50, to the opposite end of which similar mechanism is connected for controlling the other cone, so that any movement of the sprocket-wheel will, through wheel 47 and tooth 46, slide said rod in its supporting-bearings and cause the operation of the shifter mechanism of each cone. The pawls are duplicated for each cone, and each cam bar or rod for operating the same has a projecting portion 51, reduced in diameter and adapted to slide in supports 52, disposed within the cone and carried by one of the end disks 8 of the same.

The segmental blocks of wood or other suitable material are confined to the cone by the bolts passing through the slots of the same, and in addition they have springs encircling these bolts, which keep them under certain tension. When at the smaller end of the cone, their position with relation to each other is substantially as indicated at Fig. 6, while when they have reached the high end of the cone their position is substantially that shown in Fig. 7. The distance between the sections is not excessive, however, and does not affect the movement of the belt.

To compensate for the difference between the cone-pulleys when the belt is at either extreme end and when disposed at the center of the cones, I may provide a cone-pulley 53 having an arched surface of the type shown in Fig. 8. In some instances it may be desirable to place the cone upon a line-shaft, where the use of a single cone is desirable, and for this purpose I may provide a split cone of the type shown in Fig. 9, in which the two sections $3^a$ and $3^b$ are secured together by a series of bolts 55, around the line-shaft $1^a$.

When a split cone is employed, it will be necessary to provide other means than the threaded sleeve for moving the belt-guide on the same. In Fig. 8 I show a structure in which two smaller feed-screws are employed, (only one of which is shown,) one being carried by each half of the cone. These screws carry pinions 56, which are driven from an internally and externally racked member 57 by the arrangement of pawls already described. In this case this member may be in two sections in order to be placed around the line-shaft.

The pawls in engagement with the annular racked member 35 are moved in both directions by the cam-rods to effect the feed of the threaded sleeve or the screws and the consequent movement of the belt-guide with respect to the cone-pulleys. These pawls are provided with springs 60 to hold them in engagement with the exterior rack 61 of said member, and they are confined against lateral movement by a guide or housing 62, secured to the inner face of the disk 8 of each pulley. When said pawls are moved to cause one or the other to act on the teeth of the racked member and effect the movement of the same, the other pawl is to be released from its engagement with said racked member, and to effect this I provide a fixed projection 63 on the inner face of the disk, against which the heel of the loose pawl strikes when they are being moved in one direction or the other.

Having thus described my invention, I claim and desire to secure by Letters Patent—

1. A speed-changing device comprising a cone-pulley having a slotted surface, a shaft extending through said pulley, a belt-guide carried by said pulley and having portions extending into said slots, and means within the pulley and outside of the shaft for moving said guide parallel to the axis of rotation of the pulley.

2. A speed-changing device comprising a shaft, a cone-pulley thereon having a series of slots extending from end to end of the same, a belt-guide carried by said pulley and having portions extending into the slots, and means including a structure journaled on the shaft within the pulley for moving said guide from end to end of the pulley.

3. A speed-changing device comprising a cone-pulley having a series of slots extending from end to end of the same, a belt-guide carried by said pulley and having portions extending into said slots, a threaded hub carried by said belt-guide, and a threaded sleeve for moving said guide from end to end of the pulley.

4. A speed-changing device comprising a cone-pulley having a series of slots extending from end to end of the same, a belt-guide carried by said pulley and having portions extending into said slots, a threaded hub carried by said guide, a threaded sleeve for moving said guide from end to end of the pulley, and means for turning said sleeve to effect such movement of the guide.

5. A speed-changing device comprising a cone-pulley having a series of slots extending from end to end of the same, a belt-guide carried by said pulley, segmental blocks carried by said guide and forming a surface for the power-transmitting belt, and means within the pulley for moving said guide.

6. A speed-changing device comprising a cone-pulley having a series of slots extending from end to end of the same, a belt-guide carried by said pulley, segmental blocks carried by said guide and forming a surface for the power-transmitting belt, and means within the pulley for moving said guide, said blocks being guided by the slots in the pulley and separating when the guide is moved from the low to the high position on the cone and contracting when the direction of movement is reversed.

7. The combination in a speed-changing device comprising a pair of cone-pulleys each of which is slotted from end to end, of belt-guides carried by said pulleys, means within each pulley for moving its belt-guide, a series of segmental blocks confined by each of said guides and separating or contracting as said guides are moved, and a power-transmitting belt adapted to travel on said blocks and effect the movement of one pulley by the other.

8. The combination in a speed-changing device comprising a pair of cone-pulleys each of which is slotted from end to end, of belt-guides carried by said pulleys, a series of segmental blocks confined by each of the guides and separating or contracting as said guides are moved, said blocks being guided by the slots of the pulleys, a power-transmitting belt adapted to travel on said blocks, and means within the pulleys for moving the guides from end to end thereof.

9. The combination in a speed-changing device, of a pair of cone-pulleys, belt-guides carried by said pulleys, a power-transmitting belt confined by said guides, threaded hubs carried by said guides, threaded sleeves to which said hubs are adapted, and means for moving said sleeves whereby the belt-guides may be shifted from end to end of the cone-pulleys.

10. The combination in a speed-changing device, of a pair of cone-pulleys, belt-guides carried by said pulleys, a power-transmitting belt confined by said guides, threaded hubs carried by said guides, threaded sleeves to which said hubs are adapted, and means for moving said sleeves simultaneously in reverse directions whereby the belt-guides may be shifted from end to end of the cone-pulleys in unison.

11. In a speed-changing device, a cone-pulley, a belt shifter or guide carried thereby, a threaded sleeve for moving the same, a pinion carried by said sleeve, an annular racked member operatively connected to said pinion, and means for actuating said racked member.

12. In a speed-changing device, a cone-pulley, a belt shifter or guide carried thereby, a threaded sleeve for moving the same, a pinion carried by said sleeve, an annular racked member operatively connected to said pinion, and pawls for driving said racked member.

13. In a speed-changing device, the combination of a cone-pulley, a belt-guide carried thereby and having a threaded hub, a threaded sleeve to which said hub is adapted, a pinion carried by said sleeve, a racked member operatively connected to said pinion, pawls for moving said racked member and means for actuating said pawls to move the racked member.

14. In a speed-changing device, the combination of a cone-pulley, a belt-guide carried thereby and having a threaded hub, a threaded sleeve to which said hub is adapted, a pinion carried by said sleeve, a racked member operatively connected to said pinion, pawls for moving said racked member, cam-bars for actuating said pawls in both directions, and means for operatively moving said cam-bars.

15. In a cone-pulley speed-changing device, the combination of belt-guides, a series of segmental blocks confined by said guide, means for holding said blocks to the face of the cone, and means within the pulley for varying the position of the blocks at will.

16. In a cone-pulley speed-changing device, the combination of a slotted cone-pulley, a belt-guide, a series of segmental blocks confined by said guide, and means extending through the slots of the cone-pulley for holding said blocks to the face of the same.

17. A speed-changing device comprising a shaft, a cone-pulley thereon having a series of slots extending from end to end of the same, an adjustable belt-guide carried by said pulley and having portions extending into said slots, and means carried upon the outside of the shaft within the pulley for moving said guide from end to end of the pulley.

18. A speed-changing device comprising a shaft, a cone-pulley thereon having a series of slots extending from end to end of the same, a belt-guide carried by said pulley and having portions extending into said slots, means within the pulley and carried upon the outside of the shaft for moving said guide from end to end of the pulley, one of the sides of said guide being adjustable with respect to the other, and means for securing said side in its adjusted position.

19. In a variable-speed motion, the combination with two hollow cone-pulleys tapering in opposite directions and comprising slats separated to form longitudinally-extending slots, of a wheel engaging the cone-pulley and having two sets of spokes extending through said slots, sliding blocks on the outside of the cone-pulley spanning said slots and overlying adjacent slats and engaging the opposite spokes of the two sets, means to draw the sliding blocks radially inwardly, and means to move the wheels longitudinally.

20. In a variable-speed motion, the combination with two hollow cone-pulleys tapering in opposite directions and having longitudinally-extending slots, of a wheel engaging the cone-pulley and having two sets of spokes extending through said slots, sliding blocks on the outside of the cone-pulley and engaging opposite spokes of the two sets, screws engaging the sliding blocks extending through the slots of the cone-pulleys, springs between the cone-pulley and the screw to move the sliding blocks inwardly and hold them in position, and means to move the wheels longitudinally.

21. In a variable-speed motion, the combination with cone-pulleys tapering in opposite directions, said pulleys comprising end heads and tapered slats connecting said heads and spaced apart to form slots, of wedge-shaped sliding blocks spanning said slots, a wheel for each cone-pulley having spokes extending through said slots, and means to move the wheels longitudinally.

22. In a variable-speed motion, the combination with cone-pulleys located side by side and tapering in opposite directions and having longitudinal slots, of wedge-shaped blocks outside the pulleys, screws on the blocks engaging said slots, springs between the screws and the cone-pulleys, and means to slide the blocks of both cone-pulleys longitudinally.

23. In a variable-speed motion, the combination with two hollow cone-pulleys tapering in opposite directions and comprising tapered slats separated to form slots of uniform width, of a wheel comprising sliding blocks and spokes extending through the slots of the cone-pulley, said blocks engaging the slats of the cone-pulley, and means to move the wheel longitudinally of the cone-pulley and to maintain the blocks in contact therewith.

24. In a variable-speed motion, the combination with two parallel shafts, hollow cone-pulleys, fixed thereon, and tapering in opposite directions, said cone-pulleys comprising longitudinally-extending slats spaced apart and means fixedly connecting the slats of each pulley with its shaft, of two wheels one engaging each cone-pulley and comprising spokes extending between the slats and blocks engaging the slats of the cone-pulleys, and means acting simultaneously upon both wheels to move them longitudinally of the cone-pulleys and shafts.

In testimony whereof I have signed my name to this specification in the presence of two subscribing witnesses.

FRANKLIN W. WANDLESS.

Witnesses:
MURRAY C. BOYER,
JOS. H. KLEIN.